March 25, 1969     J. R. YODER ET AL     3,435,212
RADIOMETRIC MICROSCOPE WITH MEANS TO
PRODUCE A VISUAL IMAGE
Filed Sept. 10, 1965     Sheet 1 of 3
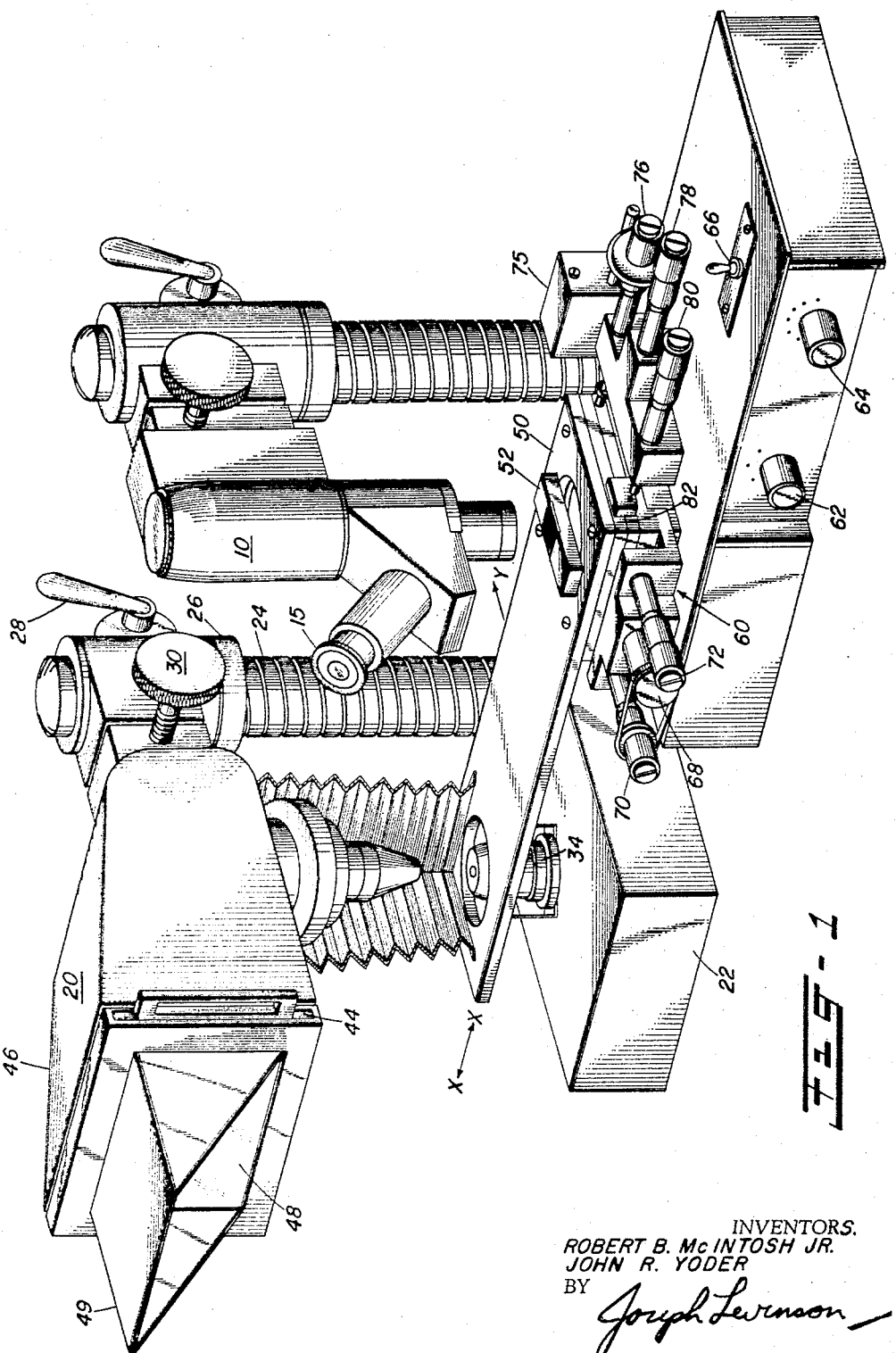
INVENTORS.
ROBERT B. McINTOSH JR.
JOHN R. YODER
BY Joseph Levinson
ATTORNEY

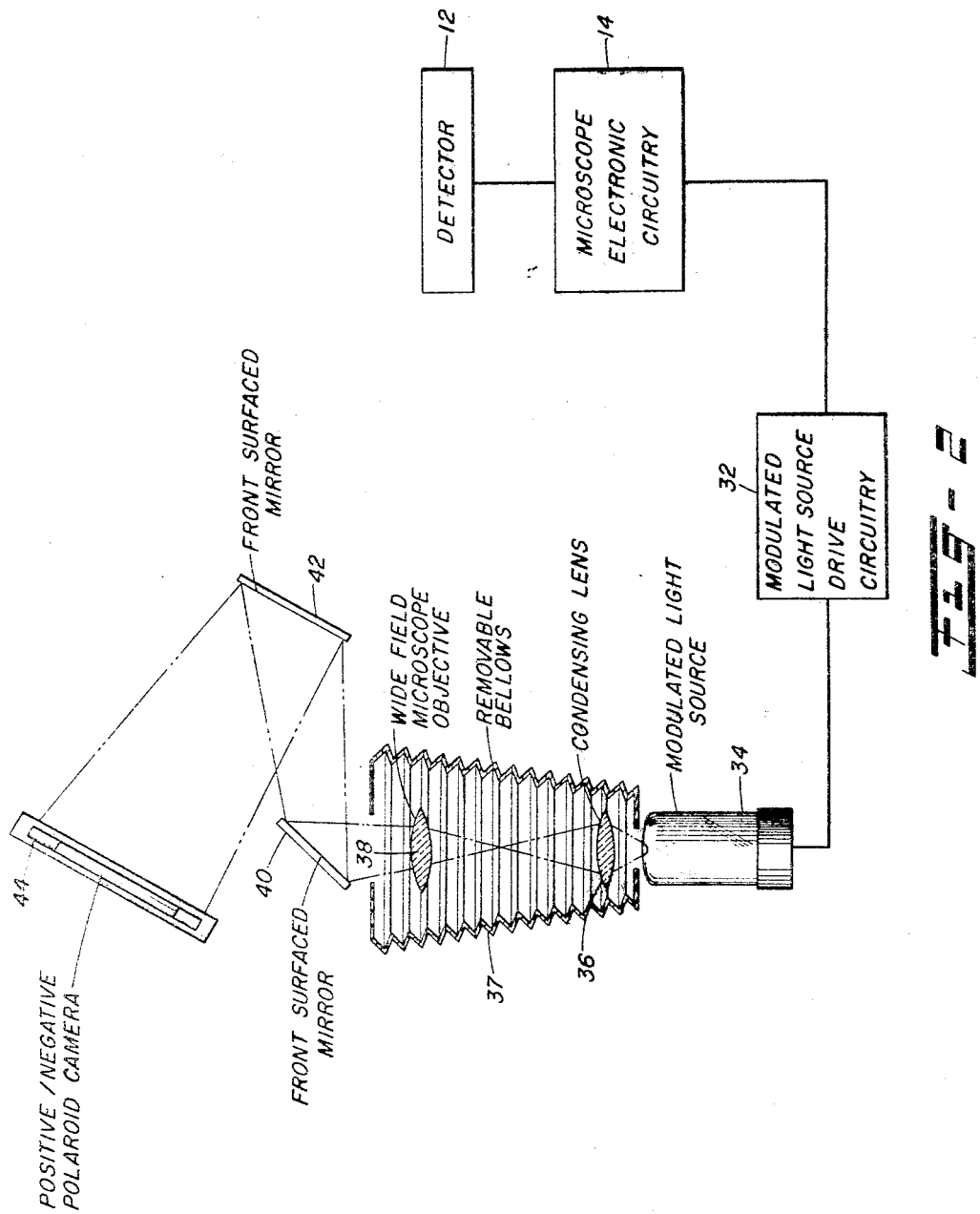

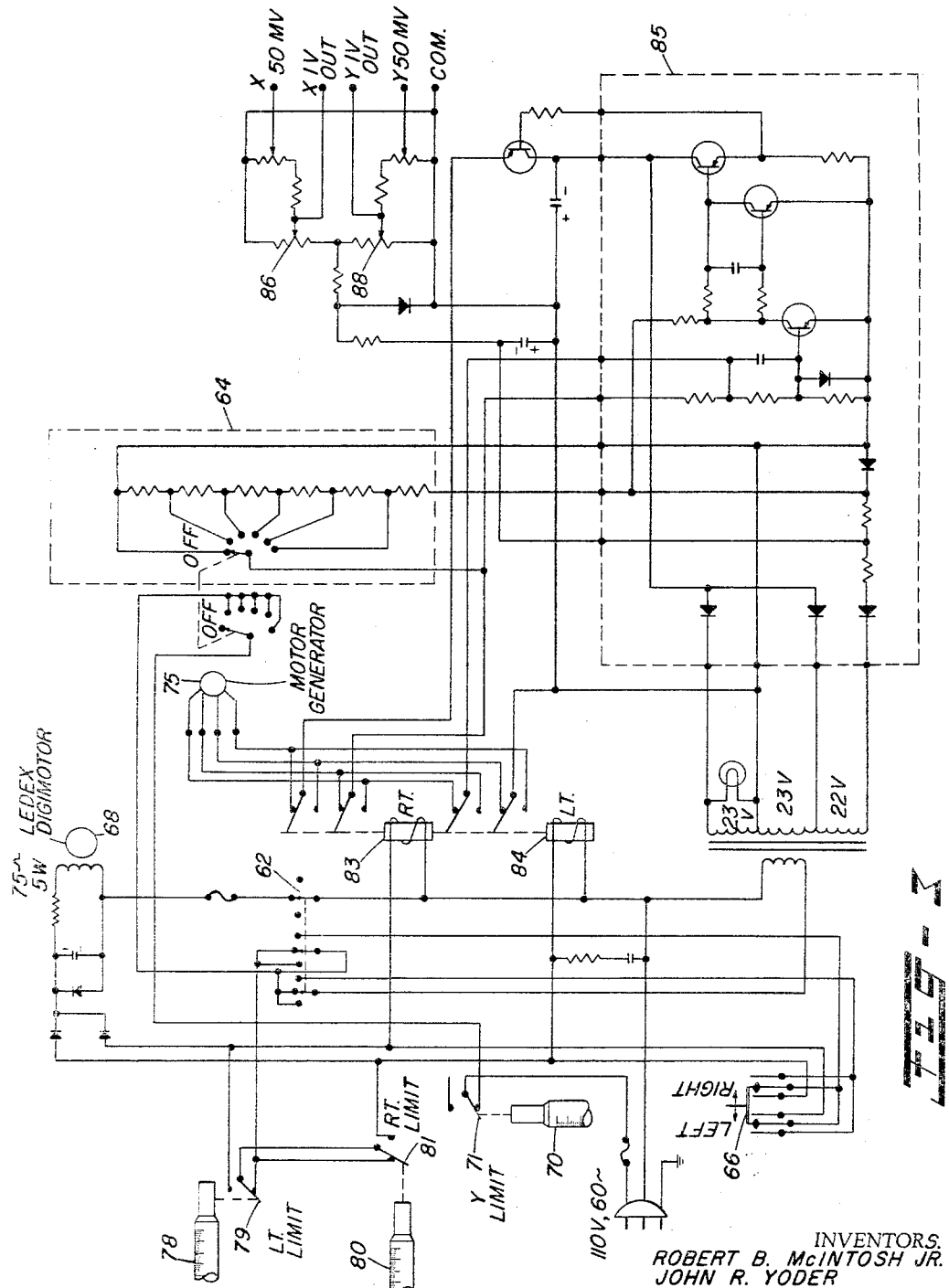

United States Patent Office 3,435,212
Patented Mar. 25, 1969

3,435,212
RADIOMETRIC MICROSCOPE WITH MEANS TO PRODUCE A VISUAL IMAGE
John R. Yoder, Westport, and Robert B. McIntosh, Jr., Greenwich, Conn., assignors to Barnes Engineering Company, Stamford, Conn., a corporation of Delaware
Filed Sept. 10, 1965, Ser. No. 486,315
Int. Cl. G01n *23/20;* G01t *1/16*
U.S. Cl. 250—65                    2 Claims

ABSTRACT OF THE DISCLOSURE

A radiometric microscope has a scanning substage on which samples to be examined are positioned and moved in a predetermined scan pattern. At the same time a light source which is modulated by the output of the radiometric microscope is directed on a light sensitive surface and moved in synchronism with the scanning substage to trace the same scan pattern on the light sensitive surface thereby producing a visual image of the thermal patterns existing on samples as viewed by the microscope.

---

This invention relates to a thermomicrograph for photographically recording thermal images produced by an infrared radiometric microscope. This instrument solves the traditional problem of data storage and correlation by producing thermal picture facsimiles of the thermal patterns existing on microstructures, thereby eliminating print-by-print measurement currently required by the microscope alone.

In an application Ser. No. 415,433 entitled, Infrared Radiometric Microscope, filed Dec. 2, 1964, which is assigned to the assignee of the present invention, a means is provided for effectively measuring infrared radiation emitted from extremely small objects or small areas of objects. A particularly useful field of application for the radiometric microscope of the aforesaid application is in the field of non-destructive testing. The miniaturization which is taking place in electronic circuitry presents a number of industrial and scientific problems. As an example, consider the case of integrated circuits which present design, manufacture, and reliability problems. Due to size, it is sometimes difficult to make contact with the integrated circuit without seriously damaging the circuit or actually destroying it. With the use of a radiometric microscope, thermal measurements can be made without contacting or damaging the integrated circuit. Utilizing the radiometric microscope during the design of an integrated circuit can indicate whether the microcircuit elements are properly oriented to insure optimum heat dissipation, as improper location of power-dissipating elements can adversely affect circuit performance. Thus, with the proper geometry and layout of circuit elements, hot spots resulting from non-uniform power dissipation may be eliminated. In the manufacture of integrated circuits, infrared microscopy can be utilized to inspect the integrated circuits for improper connections, bonding and adhesion of circuit elements by detecting irregular thermal patterns in the circuits. The infrared microscope may be also utilized in the area of reliability, where failure and temperature appear to be related. Although the infrared radiometric microscope is useful in all of the aforesaid functions, it is even more valuable when a sample under observation is scanned by the microscope, and a thermal image of that area permanently recorded for further study of the entire area under observation at one time rather than the point-by-point analysis which is now provided by the infrared microscope. Thus, in the design of an integrated circuit, a thermal image of the entire circuit may be made, and can be compared with thermal images of different designs to obtain optimum thermal patterns. Likewise, in testing for faulty integrated circuits in manufacture, a thermal profile of a satisfactory circuit may be compared with newly manufactured ones to check and make sure that the heat patterns are similar.

Accordingly, it is an object of this invention to provide a thermomicrograph which provides a thermal image in photographic form of small samples which are under examination of an infrared radiometric microscope.

In carrying out this invention in one illustrative embodiment thereof, an infrared radiometric microscope is provided with a scanning substage on which samples to be examined are positioned, and moved under said microscope in a predetermined manner which allows the microscope automatically to observe a complete area of the sample under test. A light source which is directed on a lightsensitive surface is moved in synchronism with the scanning substage to trace an area on the light-sensitive surface similar to the area scanned on the sample under observation. At the same time, the radiometric signal output from the infrared radiometric microscope is applied to modulate the light source in accordance with the infrared radiation received from the sample under observation. In this way, a visual image is produced corresponding to the thermal pattern existing on the sample seen by the microscope. The degree of brightness of a small area of the microthermogram visual image produced on the light-sensitive surface indicates the temperature of the corresponding area on the object under study.

The invention, both as to organization and method of operation, together with further objects and advantages thereof, may best be understood by reference to the following description taken in connection with the accompanying drawings, in which FIG. 1 is an isometric view of the thermomicrograph embodied in this invention, FIG. 2 is a schematic diagram, partly in block form, of the thermomicrograph embodied in this invention, and FIG. 3 is a schematic diagram of a scanning substage utilized in the present invention.

The thermomicrograph as shown in FIG. 1 is comprised of three basic units, which include an infrared radiometric microscope 10, a visual thermal image unit 20, and a scanning substage 60. The infrared radiometric microscope 10 is shown and described in detail in the aforesaid application Ser. No. 415,433, which is assigned to the assignee of the present application, and therefore will not be described in detail in the present application. The radiometric microscope 10 performs the function of providing radiometric signals which correspond to the radiation emitted and are indicative of the temperature of small areas of samples under observation. The microscope 10 includes an infrared detector 12 and microscope electronic circuitry 14 (shown in block form in FIG. 2) for deriving these signals. So that the areas being observed radiometrically may be seen visually, a visible channel is provided which includes an eyepiece 15 so the observer may see the area whose infrared radiation is being measured.

The function of the thermal image unit 20 is to provide a visual display of the radiometric signals which are derived from samples under test by the infrared microscope 10. The thermal image unit 20 therefore converts the radiometric signals into visual presentations which are capable of being visually inspected by the human eye. The thermal image unit 20 is mounted on a stand 22 which has mounted thereon a vertical positioning column 24 and a vertical positioning control 26 for adjusting the position of the unit 20 in a vertical direction. A vertical position lock 28 and a focus control 30 are also included.

Referring now to FIG. 2, which schematically shows the thermal image unit 20, output signals from the electronic circuitry 14 are fed to a modulated light source drive circuitry 32 which drives a modulated light source 34 which may be, for example, a glow modulator tube. By varying the intensity of the drive signal to the light source 34, the beam of light which is emitted by the light source 14 is intensity modulated in accordance with the amplitude of the signal received from the infrared microscope, which, of course, corresponds to the amount of radiation received from the area of the sample under test. The light emanating from the modulated light source 34 is applied through a condensing lens 36 and a wide field microscope objective lens 38 to a camera 44 which may be a Polaroid camera or any other suitable type, via front-surface mirrors 40 and 42. A removable bellows 37 surrounds the wide field microscope objective lens 38 to prevent external light from interfering with the photographic processes.

Referring again to FIG. 1, the camera 44 is encased in a housing 46 which includes a viewing screen 48 and a retractable cover 49. The viewing screen 48 is utilized with the camera 44 removed, to give an idea of the area covered, and for alignment and focusing procedures before a photograph or thermal image is made of the sample under observation by the microscope 10. When the operator is ready to make a thermogram, or thermal image, the retractible cover 49 is closed, and the camera plate 44 inserted, and the picture is taken.

In order to provide meaningful information in the form of a thermal image on film, a given area must be covered. If only a single piece of information were required from a single point on a sample under observation, this could be measured by a meter, and would not require thermographing. The scanning substage 60 performs the function of moving an object under observation in a predetermined manner so that an area of the sample is scanned radiometrically by the detector 12 in the infrared microscope 10. At the same time, the modulated light source, slaved to the substage, is scanned over film with signals from the radiometric microscope being applied to the modulated light source, thereby providing a recorded thermal image of a complete area under observation. The scanning substage 60 is a fully automatic, electromechanical unit which provides line scanning along the X axis and step scanning along the Y axis. A plate 50 carrying a sample 52 is mounted on the two-axis movable table 82 of the scanning substage 60. Also mounted on the plate 50 is the modulated light source 34. Accordingly, when an X–Y scan pattern provided by the movable table 82 is applied to the plate 50, the sample 52 and the modulated light source 34 are driven with the same X–Y scanning pattern in synchronism. Accordingly, the pattern observed by the radiometric microscope on the sample 52 is simultaneously recorded by the camera 44.

As has been pointed out above, the scanning substage 60 performs the scanning function for the thermomicrograph. As is shown in FIG. 1, a mode switch 62 is provided which allows line scan in the X direction, or an X–Y scan, or a manual operation. The scanning substage is also provided with a scanning speed selector switch 64 which controls the speed of the scanning cycle. Some of the other elements which are shown in FIG. 1 include a manual mode left-right switch 66, a stepping motor 68, a forward-limit micrometer 70, a back limit micrometer 72, a D.C. motor generator 75, a micrometer drive head 76, a left limit micrometer 78, a right limit micrometer 80, and the movable table 82 to which the plate 50 is mounted which carries a sample 52 under observation by the infrared radiometric microscope 10.

Reference is now made to FIG. 3 which is a complete schematic diagram of the scanning substage 60, which shows schematically a number of the enumerated elements which are shown on FIG. 1. Since FIG. 3 shows all the necessary electrical connections, they will not be set forth in detail herein, and the substage will be described in terms of function of its most important elements. Scanning is performed in the X-axis direction by driving the spring-loaded movable table 82 along the X-axis by the micrometer drive head 76 which is coupled to and driven by a D.C. servo drive system including motor-generator 75. The speed of the X-axis drive system is controlled by a five-position scanning speed selector switch 64, which in the illustrated embodiment enables the movable table 82 to be driven at 1, 2, 4, 8 or 16 milli-inches per second. The D.C. servo motor generator 75 supplies the power for driving the micrometer drive head 76. The generator of the motor generator 75 is used to provide a feedback voltage for the motor so that constant speed operation may be obtained. The distance the movable table 82 moves in the X direction is set by means of micrometers 78 and 80 which control limit switches 79 and 81, respectively. The right-limit microswitch 81 is mounted on the side of the table 82 so that it makes contact with the right-limit micrometer 80 when the table 82 reaches the set limit of travel to the right (direction referenced to FIG. 1). The left-limit microswitch 79 is attached to the moving table 82, but it rides on the spindle of the left-limit micrometer 78. As the table 82 is driven to the right along the X-axis (see FIG. 1) and the set limit of travel to the right is reached, the right-limit microswitch 81 makes contact with its micrometer 80 and energizes a relay 83. The relay 83 reverses the polarity of the voltage applied to the motor generator 75, and changes the connections to the motor generator such that the operation of the motor-generator is reversed, which action causes the direction of rotation of the motor-generator 75 to change, and the table 82 is then driven to the left. As the table 82 moves to the left, the left-limit microswitch 79 rides toward the free end of the left-limit micrometer 78. When the table reaches the left limit, the microswitch 79 drops off the end of the micrometer 78 spindle, energizing relay 84. The energization of relay 84 reverses the polarity of the input voltage and the connections to the motor-generator 75, so that the action of the motor generator 75 is again reversed, and the table is then driven again to the right.

For producing Y-axis scanning, a stepping motor micrometer drive is used which moves the table at the end of each X line scan. The Y-axis drive system drives the table 82 in one direction only. Accordingly, the back-limit micrometer 72 is set to determine the starting point of Y-axis scanning. When scanning begins in the X-axis direction, each time a line scan is completed in the X direction, thus each time the X-axis drive system reverses direction, the pulse applied to the reversing relays 83 and 84 is also applied to the Y-axis stepping motor 68. The stepping motor 68 is thus activated, and drives the table 82 one position forward in the Y-axis direction. The forward-limit micrometer 70, and its associated forward limit microswitch 71 operate in the same manner as the right-limit configuration in the X-axis system. When the table 82 reaches the set forward limit, the microswitch 71 makes contact with the micrometer 70 spindle, which, unlike the X-axis system, causes the system to cease scanning.

In order to accurately determine the position of the table 82, two rectilinear potentiometers 86 and 88 are mounted on the base of the unit, and have their wiper arms connected to the table 82. A regulated D.C. voltage from the power supply 85 is applied across potentiometers 86 and 88. As the table 82 moves, the wiper arms are moved, and the voltage on the wiper arms of the potentiometers 86 and 88 varies with the position of the table 82. These voltages appear at outputs at two voltage and impedance levels. This provides accurate information with respect to the positioning of the sample 52 under observation at any given period of time during the scan pattern.

The thermomicrograph greatly extends the use and capability of infrared radiometric microscopes, as well as other radiometric instruments. A thermal image of an area under examination of the radiometric microscope can be permanently recorded on photographic film for detailed analysis. The heat patterns of miniaturized electronic equipment can be studied from a single photograph which contains in a simple form thousands of bits of radiometric information. Such pictures can be used to facilitate the design, manufacture, and reliability of small components and circuits. The thermomicrograph is also suitable for use in a wide variety of other applications.

Since other modifications, varied to fit particular operating requirements and environments, will be apparent to those skilled in the art, the invention is not considered limited to the examples chosen for purposes of disclosure, and covers all changes and modifications which do not constiute departures from the true spirit and scope of this invention.

What we claim is:

1. A thermomicrograph for recording or displaying thermal images from signals produced by an infrared radiometric microscope, comprising, in combination,
   (a) an infrared radiometric microscope for deriving radiometric signals from small samples under observation, the amplitude of said signals corresponding to the infrared radiation emitted from said samples,
   (b) motor driven table on which samples to be observed are positioned for moving said samples under said microscope in a predetermined manner, thereby allowing said microscope to scan said samples,
   (c) a light source emitting a light beam,
   (d) drive means coupled to said light source for controlling the intensity of said light beam,
   (e) means applying said radiometric signals to said drive means for modulating said light beam in accordance with the amplitude of said radiometric signals,
   (f) a light sensitive surface,
   (g) means for applying said light beam to said light sensitive surface, and
   (h) means for moving said light source in synchronism with said motor driven table comprising a direct mechanical coupling between said table and said modulated light source whereby said light source is scanned across said light sensitive surface to produce a thermal image on said light sensitive surface of the area of the samples seen by said microscope.

2. The thermomicrograph set forth in claim 1 having a means for selecting and controlling the scanning pattern of said motor driven table.

References Cited

UNITED STATES PATENTS

| | | | |
|---|---|---|---|
| 2,895,049 | 7/1959 | Astheimer et al. | 250—65 |
| 3,103,584 | 9/1963 | Shapiro et al. | |
| 3,109,059 | 10/1963 | Kargl | 346—79 |

OTHER REFERENCES

Walker, Roschen, and Schlegel, An Infrared Scanning Technique, I.E.E. Transactions, ED–10, No. 4, July 1963, p. 263.

RALPH G. NILSON, *Primary Examiner.*

S. C. SHEAR, *Assistant Examiner.*

U.S. Cl. X.R.

250—83.3